US007509359B1

(12) United States Patent
Bruso et al.

(10) Patent No.: US 7,509,359 B1
(45) Date of Patent: Mar. 24, 2009

(54) MEMORY BYPASS IN ACCESSING LARGE DATA OBJECTS IN A RELATIONAL DATABASE MANAGEMENT SYSTEM

(75) Inventors: Kelsey L. Bruso, Minneapolis, MN (US); James M. Plasek, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 449 days.

(21) Appl. No.: 11/012,701

(22) Filed: Dec. 15, 2004

(51) Int. Cl.
*G06F 17/30* (2006.01)

(52) U.S. Cl. .................. 707/205; 707/100; 707/206; 711/156

(58) Field of Classification Search ................ None
See application file for complete search history.

(56) References Cited

U.S. PATENT DOCUMENTS

| | | | | |
|---|---|---|---|---|
| 5,644,763 A | * | 7/1997 | Roy | ............................. 707/101 |
| 6,061,678 A | * | 5/2000 | Klein et al. | .................... 707/3 |
| 6,192,370 B1 | * | 2/2001 | Primsch | .................. 707/103 R |
| 6,301,245 B1 | * | 10/2001 | Luzeski et al. | .............. 370/352 |
| 6,618,733 B1 | * | 9/2003 | White et al. | ............. 707/103 Y |
| 6,654,745 B2 | * | 11/2003 | Feldman | ......................... 707/9 |
| 6,721,747 B2 | * | 4/2004 | Lipkin | ......................... 707/10 |
| 6,952,699 B2 | * | 10/2005 | O'Connell et al. | ............ 707/10 |
| 7,051,033 B2 | * | 5/2006 | Agarwal et al. | ............. 707/100 |
| 7,120,645 B2 | * | 10/2006 | Manikutty et al. | .......... 707/102 |
| 2002/0120619 A1 | * | 8/2002 | Marso et al. | .................... 707/3 |

* cited by examiner

*Primary Examiner*—Cam Y Truong
*Assistant Examiner*—Shyue Jiunn Hwa
(74) *Attorney, Agent, or Firm*—Charles A. Johnson; Robert Marley; Crawford Maunu PLLC

(57) ABSTRACT

Bypassing loading of memory in accessing large data objects in a relational database. A relational database may include a plurality of first type data items and associated second type data items. In response to an update-type access request, requester memory is bypassed in writing to the relational database a second type data item referenced by a file location specified in the update-type request. In response to retrieve-type request, requester memory is bypassed in reading from the relational database a second type data item referenced in the retrieve-type request and writing the second type data item at a file location specified in the retrieve-type request.

16 Claims, 3 Drawing Sheets

MEMORY BYPASS IN ACCESSING LARGE DATA OBJECTS IN A RELATIONAL DATABASE MANAGEMENT SYSTEM

FIELD OF THE INVENTION

The present disclosure generally relates to relational database management systems.

BACKGROUND

Early relational database management systems were tailored to handle small data objects such as names, addresses, and account numbers, for example. Recently, relational systems have been adapted to accommodate large data objects. Large data objects may be generally categorized as binary large objects or character large objects and represent images, video segments, audio segments, and large documents, for example.

Some transaction-based database applications process both large and small data objects. The approach by which large data objects are transferred between the relational database management system and a requesting program may negatively impact transaction processing performance, program complexity and development time. Furthermore, in processing a large data object the object may be copied to the requester memory, which further complicates processing. For example, in processing SQL commands, data selected from a database are stored in variables in memory allocated to the requester program, and data to be inserted in the database are found in the variables in memory of the requester program. To insert a large data object in a database, the large data object is copied to the memory of the requesting program; the large data object may occupy many gigabytes of memory. This requires requester program logic to allocate the memory, and for an insert operation to read the object from its original location into requester program memory, and for a select operation to write the object data from requester program memory to the desired destination.

To allocate the amount of memory necessary to contain a large data object, the program may need to be linked in a manner different from that used to link programs that manipulate only small data objects. Similarly, the data transmission protocols such as TCP/IP or ATM are optimized for small objects, whereas file transmission protocols, such as the recognized file transport protocol (FTP), are optimized for large objects (files). A large data object is too large to be efficiently transmitted in the same manner as smaller data objects. Thus, different optimizations may be needed for large object data transfers versus the optimizations used for small object data transfers. In order to achieve acceptable performance, it is therefore necessary for the requester program to include special logic to transmit large objects. To write such logic requires knowledge of the underlying transmission protocol and is time consuming to test.

The extra program complexity along with the extra memory needed by a requester program to select and insert large data objects from and in a database will increase application development time and may hurt application performance because the application may not know how large the large data objects are going to be and therefore, cannot properly optimize memory usage or transmission protocol choice based on the size of the data transfer. A method and system that addresses these and other related issues is therefore desirable.

SUMMARY

The various embodiments of the invention allow bypassing the loading of memory with a large data object when a relational database is updated with the large data object or the large data object is read from the database. A relational database may include a plurality of first type data items and associated second type data items. In response to an update-type access request, requester memory is bypassed in writing to the relational database a second type data item referenced by a file location specified in the update-type request. In response to a retrieve-type request, requester memory is bypassed in reading from the relational database a second type data item referenced in the retrieve-type request and writing the second type data item at a file location specified in the retrieve-type request.

In another embodiment, an apparatus is provided for processing a relational database. The apparatus comprises means for relationally storing data, the data including a plurality of first type data items and associated second type data items; means for detecting references to first type data items and second type data items in requests for access to the relationally stored data; means, responsive to detection of a reference to a second type data item in an update-type access request from a requesting program, for bypassing memory allocated to the requesting program in transferring data of the referenced second type data item from a source file to a destination file that is relationally stored with the first type data items; and, responsive to detection of a reference to a second type data item in a retrieve-type access request from a requesting program, for bypassing memory allocated to the requesting program in transferring data of the referenced second type data item from a source file that is relationally stored with the first type data items to a destination file.

A system for processing a relational database is provided in another embodiment. The system includes a physical file system that is adapted to provide access to physical storage of data organized as files. A network file system is coupled to the file system and is configured to transfer contents of a source file to a destination file in response to a call to a first function of the network file system. A relational database management system (R-DBMS) is coupled to the physical file system and to the network file system. The R-DBMS is configured to manage access to a relational database having a plurality of first type data items and associated second type data items, detect references to first type and second type data items in requests for access to the relational database, detect references to first type data items and second type data items in response to an update-type access request from a requesting program, determine a destination file in the relational database for a second type data item referenced in an update-type request, and invoke the first function of the network file system specifying a source file from the update-type request and the destination file in the relational database.

It will be appreciated that various other embodiments are set forth in the Detailed Description and Claims which follow.

DETAILED DESCRIPTION

Figure 1:
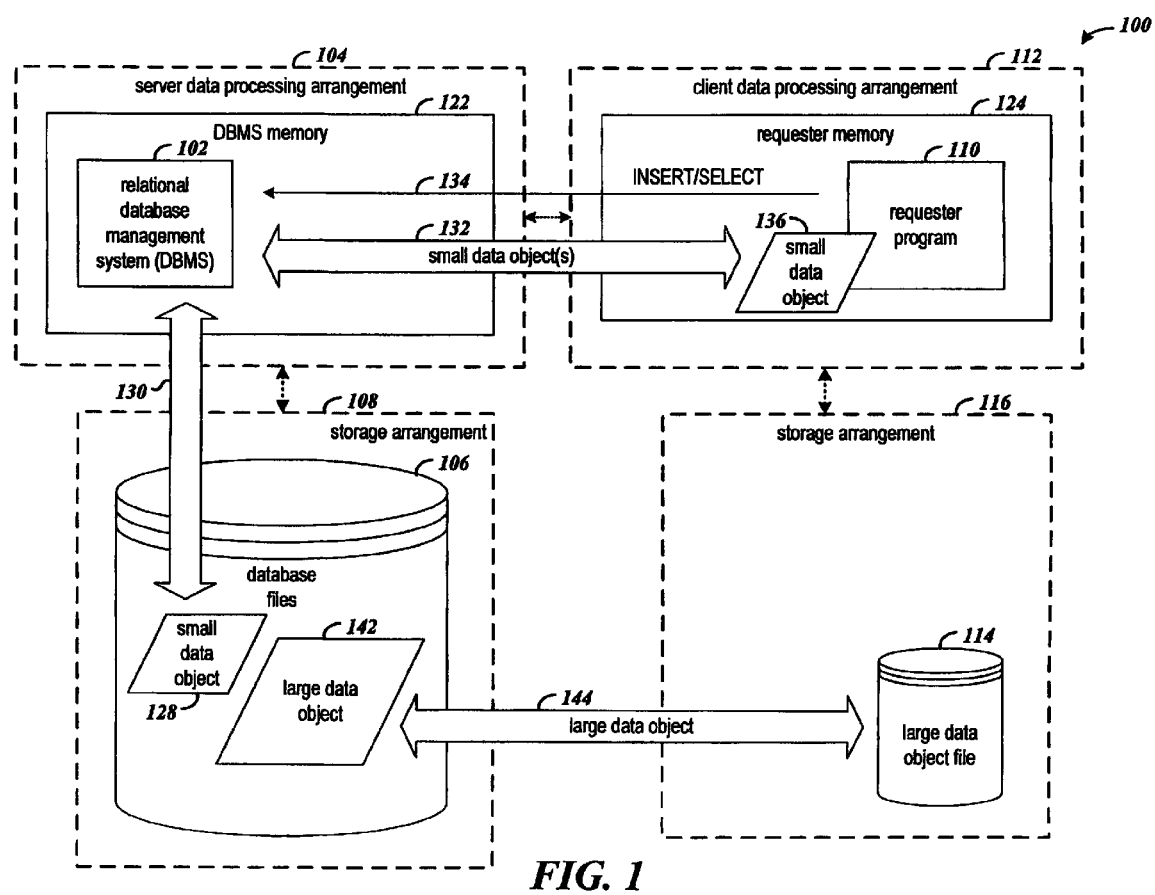
FIG. 1 is a data flow diagram that illustrates the data flow for large and small data objects relative to a database in accordance with various embodiments of the invention.

FIG. 1 is a data flow diagram that illustrates the data flow for large and small data objects relative to a database in an example computing arrangement 100 in accordance with various embodiments of the invention. A relational database management system (DBMS) 102 is hosted by a server processing arrangement 104. The DBMS manages the data of database 106, which is stored in storage arrangement 108. An example relational DBMS is the Relational Data Management System (RDMS) from Unisys. A requester program 110 is hosted by a client data processing arrangement 112. A large data object 114 manipulated in the example is stored in storage arrangement 116.

In accordance with various embodiments of the invention, the data flow through different channels in accessing small and large data objects by the requester program 110. The data of small objects flow through the traditional channel, which includes memory 122 allocated to the DBMS 102 and memory 124 allocated to the requester. An example small data object 128 is illustrated in database files 106. The data flow line 130 shows the flow of data between the DBMS and the database file, and the data flow line 132 shows the flow of data between DBMS memory 122 and requester memory 124. For a database operation that updates the database, for example an INSERT operation in Structured Query Language (SQL), the requester program submits the request to the DBMS (line 134) along with the data for the small object 136 from requester memory 124. The DBMS temporarily stores the small object in DBMS memory 122 before storing the small data object 128 in the database file 106. The process is reversed for an operation that reads a small data object from the database (e.g., an SQL SELECT command).

The data flow in manipulating a large data object 142 by a requester program is different from the data flow in manipulating a small data object. The flow of a large data objects bypasses the DBMS and requester memories 122 and 124. Bypassing the memories reduces program complexity and reduces the overhead associated with managing large memory segments.

Data flow line 144 illustrates the flow of data in accessing a large data object by a requester program. In accessing a large data object, the requester program submits a request to the DBMS. The requester program may use a special syntax in the command to indicate to the DBMS that a large data object is to be accessed. In response, the DBMS uses file transfer utilities to move the file from one storage location to another, for example between storage arrangements 108 and 116. In one embodiment, the Common Internet File System (CIFS) is used to transfer large object data in the form of a file. By using the file transfer utility, the DBMS memory 122 and requester memory 124 are bypassed both in updating the database with a large data object and in reading a large data object from the database. The CIFS may use underlying mechanisms such as the FTP to speed the process of transferring file data.

Dashed lines are used to represent the client data processing arrangement 112, server data processing arrangement 104, storage arrangements 108 and 116, and the various connections therebetween. The dashed lines indicate that any of a number of different computing and storage architectures could be used in different combinations to implement an embodiment of the invention. For example, computing arrangements such as, single and multi-processor shared memory systems, centralized and distributed systems, and parallel computing systems may be useful for different applications. Similarly, storage arrangements such as centralized or distributed storage may be useful depending on application requirements. The storage arrangements provide retentive data storage and may be implemented using any of a variety of media, including, for example, magnetic, electronic, or optical media. It will be appreciated that the DBMS 102 and requester program 110 need not be hosted on separate computing arrangements and may be hosted by the same computing arrangement if user requirements permit. In addition, the processes may be provided via a variety of computer-readable media or delivery channels such as magnetic or optical disks or tapes, electronic storage devices, or as application services over a network.

Figure 2:
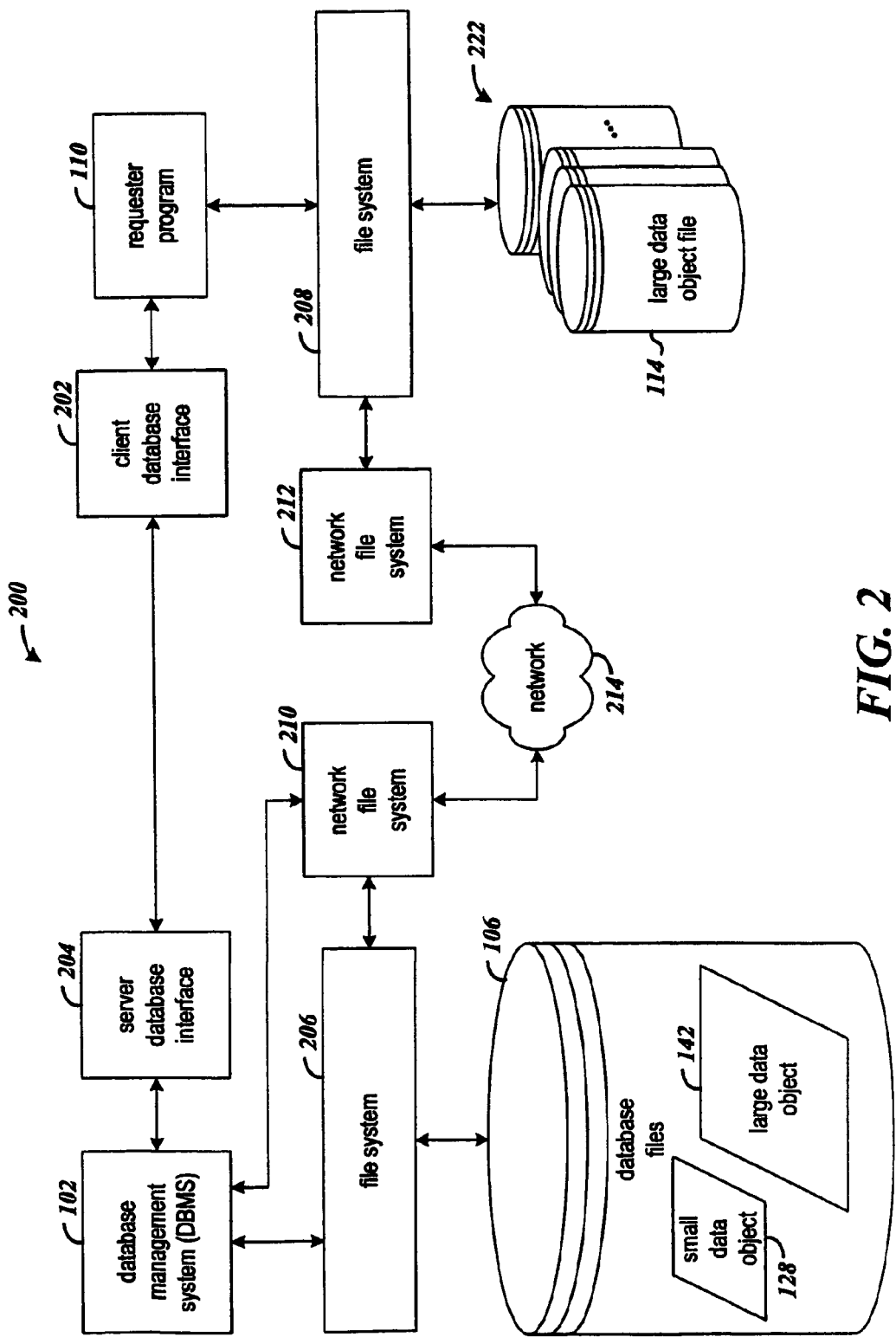
FIG. 2 is a block diagram that shows various components involved in database processing of large and small data objects in accordance with various embodiments of the invention.

FIG. 2 is a block diagram that shows an arrangement 200 of various components involved in database processing of large and small data objects in accordance with various embodiments of the invention. In addition to the DBMS 102 and requester program 110 as described in arrangement 100, arrangement 200 includes client and server database interfaces 202 and 204, file systems 206 and 208, and network file system components 210 and 212 for transferring files via network 214.

The client and server database interfaces 202 and 204 together implement an interface to a requester program for accessing the database 106. The client database interface provides a programmatic interface to the requester program for accessing the database and handles the underlying communication with the server database interface. The server interface handles the communication with the underlying relational DBMS 102. The database interfaces may be proprietary or open, such as Open Database Connectivity (ODBC) or the Java-related database connectivity interface, JDBC.

The file systems 206 and 208 manage the storage of and access to the files of database 106 and the files 222 in which the large data objects are stored. In some instances the functions of a file system are layered in physical file system layer and logical file system layer. This permits use of proprietary hardware and software (the physical layer) to be used in combination with access methods that are more open or standards based.

The database data are stored in multiple files that are managed by the file system 206, and the DBMS 102 accesses data in the database through the functions provided by the file system. Similarly, file system 208 manages access to the file in which large data objects may be stored outside the database 106. Depending on the particular application needs, the requester program (or some other program) may or may not need to manipulate the content of the large data objects in files 222. Such manipulation would involve calls to the file system 208 to access the file data.

Network file system components 210 and 212 provide an underlying mechanism to access large data objects of a database while bypassing loading of the memory objects in the memory of the requester program and memory of the DBMS. For a networked or Internet-based application, the Common Internet File System (CIFS) may be used to transfer the contents of large data object files in one embodiment. It will be appreciated other network file systems may be used in different embodiments.

In updating database 106 with a large data object, the requester program calls a function of the client database interface 202 for performing a database update. For example, the function may submit the INSERT command in SQL. The client interface 202 transmits the command to the server database interface 204, which in turn calls the appropriate functions of the underlying DBMS 102. In detecting an operation involving a large data object, the DBMS calls a function of the network file system 210. For updating the database with a large data object, the function is "get_file" in the CIFS. The network file system component 210 interacts with its peer network file system component 212 to read the target file (e.g., large data object file 114) and transmit the file to the interface 210. The interface 210 then writes the received large data object to the file specified by the DBMS (e.g., large data object 142). The DBMS may store one or more large data objects in the large data object database file 142. It will be appreciated that the embodiments of the invention are not limited to a one-to-one file relationship between an instance of 114 and an instance of 142. That is, the embodiments of the invention may be used to write a large data object file to multiple large data objects in a database, or read multiple large data objects from the database and stored the objects in a single large data object file. Similarly, multiple large data object files may be written to a single large data object in the database, and a large data object may be read from the database and the data written to multiple large data object files.

In retrieving a large data object from database 106, the requester program calls a function of the client database interface 202 for reading from the database. For example, the function may submit the SELECT command in SQL. The client interface 202 transmits the command to the server database interface 204, which in turn calls the appropriate functions of the underlying DBMS 102. In detecting the operation to retrieve a large data object, the DBMS calls a function of the network file system 210, for example, "put_file" in the CIFS. The network file system 210 reads the large data object from a file in the database 106 and interacts with its peer network file system component 212 to write the data to a target file (e.g., large data object file 114).

It will be appreciated that the present invention is not limited to files 142 that are internal to a database. For example, the SQL 99 standard supports management of external data. This capability allows arbitrary external files such as the set of files 222 to be considered part of a database. Thus, the techniques of the present invention may also be used in SQL-based applications in which external database files are used.

In one embodiment of the invention, only one computer system is involved. Files 106 and 222, file systems 206 and 208, and network file systems 210 and 212 all reside on the same computer system, and network 214 exists only conceptually within the components of the network file system.

Figure 3:
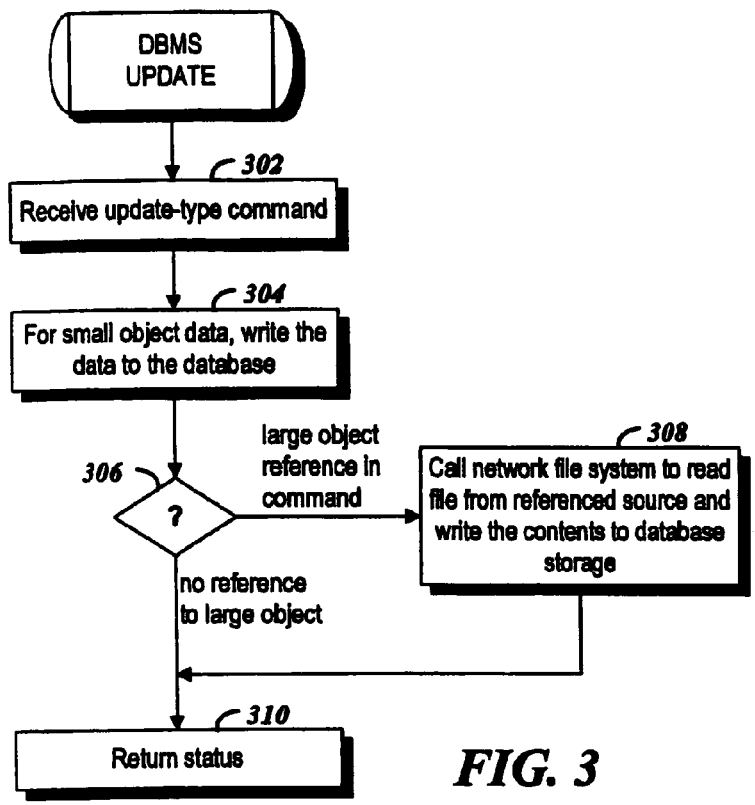
FIG. 3 is a flow diagram that shows the processing performed by a database management system for an update-type command in accordance with various embodiments of the invention.

FIG. 3 is a flow diagram that shows the processing performed by a database management system for an update-type command in accordance with various embodiments of the invention. An update-type command may involve adding further data to the database or modifying existing data, and the SQL INSERT command serves as an example.

In receiving an update-type command (step 302), the DBMS processes the data objects referenced by the command according to whether the data objects are small data objects or large data objects. The distinction between small and large objects is recognized by the manner in which the objects are referenced in the command received. Using the SQL INSERT command for example, the syntax is:

INSERT INTO customer_table (cust_id_col, cust_name_col, cust_picture_col)
VALUES (customer_id, customer_name, get_file('/a/dir/pics/r29384.jpg'));

The customer_id and customer_name are recognized as variables for small data objects, and get_file('/a/dir/pics/r29384.jpg') is recognized as a function that references a large data object.

For each small data object in the command, the DBMS writes the data to the database (step 304). It will be appreciated that along with the command, the data of the small data objects are passed to the DBMS by the requester program. An in-memory copy or portion of the database may then be written to retentive storage.

The cust_picture_col contains information that allows the DBMS to derive the file name. This information may include the file name, the starting position of the object in the file, the size of the object and other implementation-specific information, for example. The DBMS stores in the cust_picture_col column of the customer_table information that allows the DBMS to find the large data object.

If a large data object is referenced in the command (decision 306), the DBMS calls the network file system to transfer the file from the referenced source to a database file (step 308). In the example, SQL INSERT command, the DBMS calls the get_file function of the network file system with /a/dir/pics/r29384.jpg as the file to transfer. The DBMS allocates space in the collection of database files and provides the location to the network file system as the destination. The DBMS may allocate a portion of a database file, which is shared with other large objects, to the new large object; it may allocate an entire database file for the new large object; or it may allocate several database files to store the new large object. The choice depends on the large object management strategy of the DBMS and on the space available in the set of database files. Each of network file system components 212 and 210 calls the respective local file systems 208 and 206 to read the data from and write the data to the physical storage.

Once the file system 206 has written the data to the physical storage, a status is returned to the network file system 210, and the network file system in turn returns a status to the database management system, which returns the appropriate status to the requester program (step 310).

Figure 4:
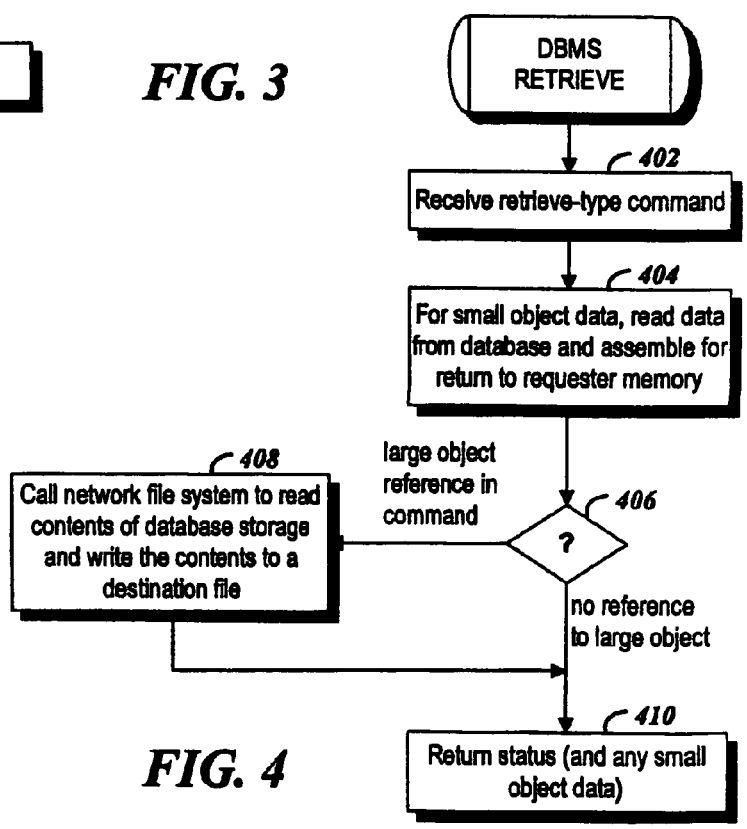
FIG. 4 is a flow diagram that shows the processing performed by a database management system for a retrieve-type command in accordance with various embodiments of the invention.

FIG. 4 is a flow diagram that shows the processing performed by a database management system for a retrieve-type command in accordance with various embodiments of the invention. A retrieve-type command involves reading data from the database, and the SQL SELECT command serves as an example.

In receiving a retrieve-type command (step 402), the DBMS processes the data objects referenced by the command according to whether the data objects are small data objects or large data objects. As with the update-type command, the distinction between small and large objects is recognized by the manner in which the objects are referenced in the command received. Using the SQL SELECT command for example, the syntax is:

SELECT cust_id_col, cust_name_col, put_file(cust_picture_col, '/a/dir/pics/r29384.jpg')
FROM customer_table;

The customer_id_col and customer_name_col are recognized as references to small data objects, and put_file (cust_picture_col, '/a/dir/pics/r29384.jpg') is recognized as a function that references a large data object.

For each small data object in the command, the DBMS reads the referenced data from the database and assembles the data in DBMS memory to return to the requester (step 404). The information in cust_picture_col is used to find the LOB. As explained above, the large data object may be stored in a single, dedicated file, in multiple files, or in a single file along with other large data objects.

If a large data object is referenced in the command (step 406), the DBMS calls the network file system to transfer the file from the database to the referenced destination (step 408). In the example SQL SELECT command, the DBMS determines the file location for the cust_picture_col data item and calls the put_file function of the network file system to transfer the large object value to the referenced large object file 114. The string /a/dir/pics/r29384.jpg indicates the destination file to which the large data object is to be transferred. Network file system component 210 calls file system 206 to read the reference file and transfers the large object data to network file system component 212. Network file system component 212 calls file system 208 to write the large data object to the referenced file.

Once the file system 208 has written the data to the physical storage, a status is returned to the network file system component 212, and the network file system component 212 in turn returns a status to the network file system component 210. The network file system component 210 returns a status to the database management system 102, which returns any retrieved small data objects and the appropriate status to the requester program (step 410).

The present invention is thought to be applicable to a variety of database management systems and particularly applicable and beneficial in database applications directed to large data objects. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for processing data, comprising:
    establishing and providing access to a relational database with a database management system (DBMS), the relational database including a plurality of first type data items and associated second type data items; and
    transmitting an access request from a requester to the DBMS;
    determining by the DBMS whether the access request references a first type or second type data item, wherein the access request with the second type data item includes a relational database access command and a file path name that references a source file or a destination file that is accessible to the requester by the file path name;
    bypassing requester memory in providing access to the second type data item in the relational database;
    wherein for a retrieve-type access request the providing access comprises reading from the relational database the second type data item referenced in the retrieve-type request without occupying memory allocated to the DBMS and writing the second type data item to the destination file referenced by the file path without occupying memory allocated to the DBMS;
    wherein the providing access to the second type data item includes transferring data between the database and the source file or the destination file referenced by the file path name;
    in response to the access request referencing a first type data item, storing the first type data item in memory allocated to the requester;
    wherein for an update-type access request for the first type data item, the storing of the first type data item includes writing the first type data item from requester memory to the relational database; and
    wherein for the retrieve-type access request for the first type data item, the storing of the first type data item includes writing the first type data item from the relational database to requester memory.

2. The method of claim 1, wherein for an update-type access request the providing access comprises reading the second type data item referenced by the file path name of the source file and writing the second type data item to the relational database.

3. The method of claim 1, wherein the bypassing step includes moving data using a file transport protocol.

4. A processor-implemented method for processing data, comprising:
    a relationally storing data in a first retentive storage arrangement using a database management system (DBMS), the data including a plurality of first type data items and associated second type data items;
    detecting references to first type data items and second type data items in requests from a requesting program for access to the relationally stored data, wherein a request for a second type data item includes a relational database access command and a file path name that references a source file or a destination file that is accessible to the requesting program by the file path name;
    responsive to detection of a reference to the second type data item in an update-type access request from the requesting program, bypassing memory allocated to the requesting program in transferring data of the referenced second type data item from the source file in a second retentive storage arrangement to a file in the first retentive storage arrangement that is relationally stored with the first type data items and without occupying memory allocated to the DBMS;
    responsive to detection of the reference to the second type data item in a retrieve-type access request from the requesting program, bypassing memory allocated to the requesting program in transferring data of the referenced second type data item from the file that is relationally stored in the first retentive storage arrangement with the first type data items to the destination file in the second retentive storage arrangement and without occupying memory allocated to the DBMS;
    responsive to detection of the reference to a first type data item in the update-type access request from the requesting program, transferring data of the referenced first type data item from memory allocated to the requesting program to memory allocated to the relationally stored data in the first retentive storage arrangement; and
    responsive to detection of the reference to the first type data item in the retrieve-type access request from the requesting program, transferring data of the referenced first type data item from the relationally stored data in the first retentive storage arrangement to memory allocated to the requesting program.

5. The method of claim 4, further comprising:
    transferring data of a first type data item from memory allocated to the requesting program to a first type data item in the relational database in response to a request of the update-type from the requesting program; and
    transferring data of a first type data item in the relational database to memory allocated to the requesting program in response to a request of the retrieve-type from the requesting program.

6. The method of claim 4, wherein the update-type request includes a structured query language command that specifies a first function name for obtaining data of the file and file path name as command parameters.

7. The method of claim 6, wherein the retrieve-type request includes a structured query language command that specifies a second function name and a file path name of the destination file as command parameters.

8. The method of claim 4, further comprising calling a network file system in transferring data of a second type data item.

9. The method of claim 8, wherein the network file system is the Common Internet File System.

10. The method of claim 4, wherein the second type data items are binary large objects, and the first type data items are a data type other than a binary large object.

11. The method of claim 4, wherein the second type data items are character large objects, and the first type data items are a data type other than a character large object.

12. The method of claim 4, wherein the second type data items are national character large objects, and the first type data items are a data type other than a national character large object.

13. The method of claim 4, wherein the steps of transferring data from the source file and transferring data to the destination file use a file transport protocol.

14. An apparatus for processing data, comprising:
a processor; a memory;
a database management system (DBMS) for relationally storing data in a first retentive storage arrangement, the data including a plurality of first type data items and associated second type data items;
  means for detecting references to first type data items and second type data items in requests from a requesting program for access to the relationally stored data, wherein a request for a second type data item includes a relational database access command and a file path name that references one of a source file or a destination file that is accessible to the requesting program by the file path name;
  means, responsive to detection of a reference to the second type data item in an update-type access request from the requesting program, for bypassing memory allocated to the requesting program in transferring data of the referenced second type data item from the source file in a second retentive storage arrangement to a file in the first retentive storage arrangement that is relationally stored with the first type data items and without occupying memory allocated to the DBMS;
  means, responsive to detection of the reference to the second type data item in a retrieve-type access request from the requesting program, for bypassing memory allocated to the requesting program in transferring data of the referenced second type data item from the file that is relationally stored in the first retentive storage arrangement with the first type data items to the destination file in the second retentive storage arrangement and without occupying memory allocated to the DBMS;
  means, responsive to detection of the reference to a first type data item in the update-type access request from the requesting program, for transferring data of the referenced first type data item from memory allocated to the requesting program to memory allocated to the relationally stored data in the first retentive storage arrangement; and means, responsive to detection of the reference to the first type data item in the retrieve-type access request from the requesting program, for transferring data of the referenced first type data item from the relationally stored data in the first retentive storage arrangement to memory allocated to the requesting program.

15. A system for processing data, comprising:
a processor, a memory;
a first physical file system that provides access to physical storage of data organized as files in a first retentive storage arrangement;
a second physical file system that provides access to physical storage of data organized as files in a second retentive storage arrangement;
a network file system coupled to the first and second physical file systems, the network file system transfers between the first and second physical file systems, contents of a first file to a second file in response to a call to a first function of the network file system;
a relational database management system (R-DBMS) coupled to the first physical file system and to the network file system, the R-DBMS manages access to a relational database having a plurality of first type data items and associated second type data items stored in the first physical file system, to detect references to the first type and the second type data items in requests for access to data items in the relational database, to detect an update-type access request from a requesting program, wherein the update-type access request for a second type data item includes a relational database access command and a file path name that references a source file that is accessible to the requesting program by the file path name, the R-DBMS further determines a file in the relational database for the second type data item referenced in the update-type access request, and invokes the first function of the network file system specifying the file path name of the source file in the second physical file system from the update-type access request and the file in the relational database in the first physical file system;
wherein the R-DBMS detects references to the first type data items and the second type data items in response to a retrieve-type access request from a requesting program, wherein the retrieve-type access request for the second type data item includes the relational database access command and the file path name that references a destination file that is accessible to the requesting program by the file path name, the R-DBMS further determines the file in the relational database of the second type data item referenced in the retrieve-type request, and invoke the first function of the network file system specifying the file in the relational database and the destination file from the retrieve-type request;
wherein for the retrieve-type request for the second type data item, the first function of the network file system reads the second type data item from the file in the relational database and writes the second type data item to the destination file without occupying memory allocated to the DBMS.

16. The system of claim 15, wherein the network file system implements a file transport protocol.

* * * * *